United States Patent [19]

Gammino

[11] Patent Number: 5,812,650
[45] Date of Patent: *Sep. 22, 1998

[54] METHOD AND APPARATUS FOR INTERCEPTING POTENTIALLY FRAUDULENT

[76] Inventor: John R. Gammino, 6 E. Point Rd., Lincroft, N.J. 07738

[*] Notice: The portion of the term of this patent subsequent to Jan. 25, 2014, has been disclaimed.

[21] Appl. No.: 200,945

[22] Filed: Feb. 23, 1994

Related U.S. Application Data

[63] Continuation of Ser. No. 42,160, Apr. 2, 1993, abandoned, which is a continuation-in-part of Ser. No. 911,115, Jul. 9, 1992, abandoned.

[51] Int. Cl.⁶ ..................................................... H04M 3/38
[52] U.S. Cl. .......................... 379/189; 379/196; 379/199; 379/200
[58] Field of Search ..................................... 379/189, 200, 379/194, 91, 143, 145, 161, 198

[56] References Cited

U.S. PATENT DOCUMENTS

| | | |
|---|---|---|
| 3,761,634 | 9/1973 | Sobanski et al. . |
| 4,012,602 | 3/1977 | Jackson .................................. 379/200 |
| 4,188,508 | 2/1980 | Rogers et al. . |
| 4,332,982 | 6/1982 | Thomas ................................ 179/7.1 R |
| 4,358,640 | 11/1982 | Murray . |
| 4,425,480 | 1/1984 | Lischin . |
| 4,481,384 | 11/1984 | Matthews ............................... 379/188 |
| 4,511,765 | 4/1985 | Kuo . |
| 4,577,066 | 3/1986 | Bimonte et al. ....................... 379/243 |
| 4,782,516 | 11/1988 | Maybach et al. ...................... 379/189 |
| 4,794,642 | 12/1988 | Arbabzadah et al. ................. 379/200 |
| 4,833,707 | 5/1989 | Serret, Jr. .............................. 379/200 |
| 4,866,762 | 9/1989 | Pintar .................................... 379/200 |
| 4,933,965 | 6/1990 | Hird et al. ............................. 379/112 |
| 4,953,202 | 8/1990 | Newell .................................. 379/200 |
| 4,965,459 | 10/1990 | Murray .................................. 379/189 |
| 4,993,062 | 2/1991 | Dula et al. ............................... 379/88 |
| 5,109,408 | 4/1992 | Greenspan et al. .................... 379/197 |

FOREIGN PATENT DOCUMENTS

| | | | |
|---|---|---|---|
| 2830281 | 1/1980 | Germany .............................. 379/200 |
| 2211695 | 7/1989 | United Kingdom .................. 379/200 |

OTHER PUBLICATIONS

Worldwide Videotex Article Titled "Fraud Protection Must Accompany 10XXX Unblocking" V. 3, No. 11>T, Nov. 1991.

Worldwide Videotex article Titled "10XXX Unblocking Deadline Financially Fatal to Payphone Owners" v. 3, No. 2, Feb. 1992.

FCC 96–131 Docket (In the Matter of Policies and Rules Concerning Operator Service Access and Pay Telephone Compensation), Released Apr. 5, 1996.

TCI Manual for TC–1013SL Programmable Call Controller for Selective Call Control, ©1990.

*Primary Examiner*—Ahmad F. Matar
*Attorney, Agent, or Firm*—Ratner & Prestia

[57] ABSTRACT

Potentially fraudulent telephone calls are intercepted from public telephones. As the digits which correspond to a telephone number are entered into a telecommunications device, each number at a particular location is compared with a predetermined number. If, according to this comparison, telephone numbers which include certain digits at particular locations in the dialing sequence are entered, the telephone call is blocked. This technique may be implemented by including appropriate software into a microprocessor controlled public telephone. For public telephones which are not microprocessor controlled, a microprocessor driven system can be interposed between the public telephone and the telecommunications line. A similar algorithm can be implemented in conjunction with a PBX system. When a PBX system is being accessed from a public telephone in order to establish a telephone call using the PBX outgoing lines, the telephone numbers which are entered into the PBX can be compared with predetermined number sequences in the manner described above. A warning signal can be generated or the call can be blocked if particular dialing sequences are entered. Velocity checking can also be implemented on any of the above systems in order to detect potentially fraudulent telephone calls.

4 Claims, 9 Drawing Sheets

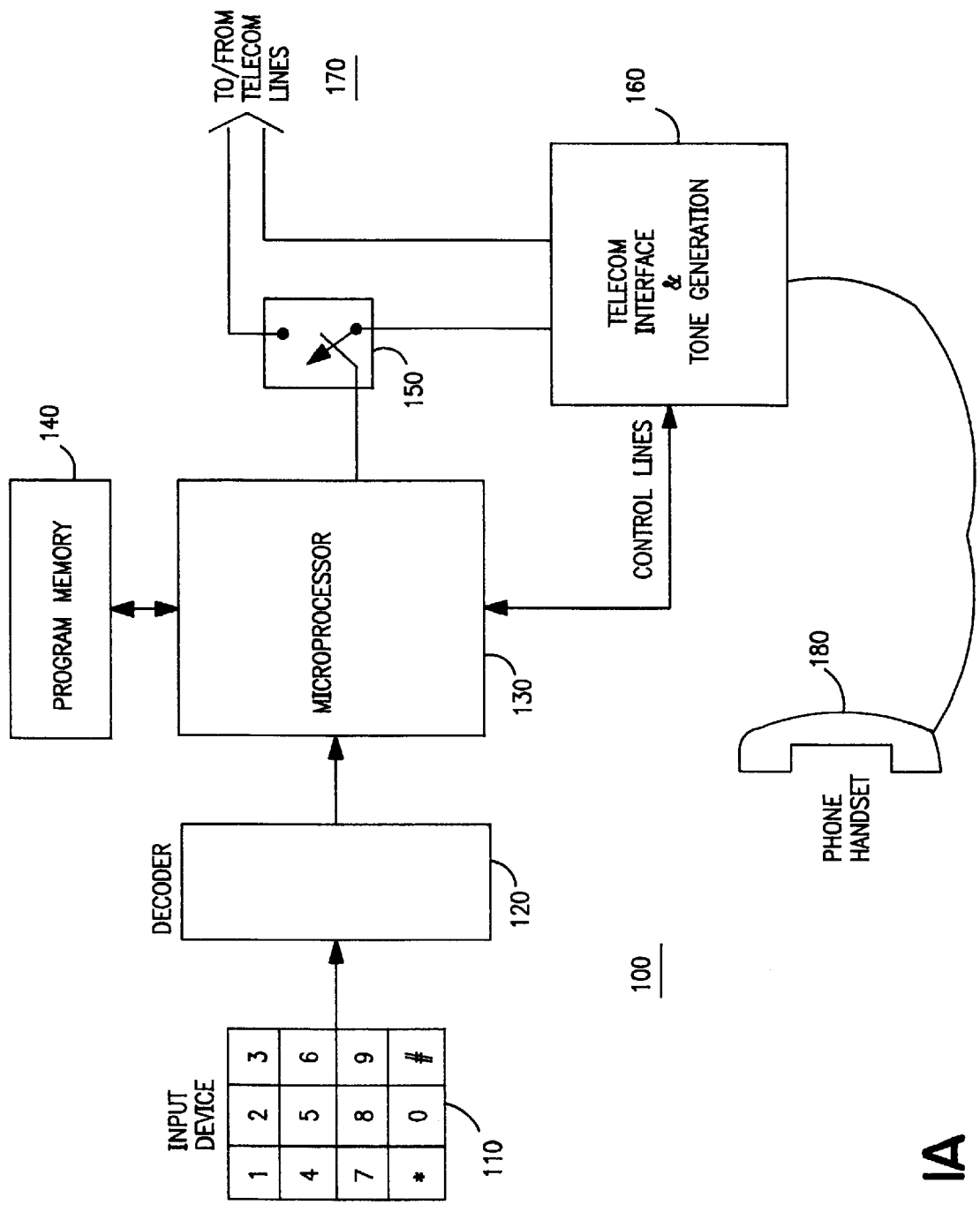
FIG. IA

METHOD AND APPARATUS FOR INTERCEPTING POTENTIALLY FRAUDULENT

This application is a continuation of application Ser. No. 08/042,160 filed Apr. 2, 1993 (now abandoned) which was a continuation in-part of application Ser. No. 07/911,115 filed Jul. 9, 1992 (now abandoned).

FIELD OF THE INVENTION

The present invention relates to telecommunications and more specifically to the selective disablement of telecommunication devices. In particular, a method and apparatus is disclosed for monitoring a sequence of digits input to a telecommunication device and selectively disabling the telecommunication device if particular digits are detected at defined locations in the sequence.

BACKGROUND OF THE INVENTION

A common method for placing a call with a telecommunications device (e.g. a pay telephone) is through the use of calling card numbers. A calling card number is a sequence of digits which may be used as input to a telecommunications device by a telecommunications user. By entering a calling card number, the cost of a subsequently placed call may be charged to a calling card account. The charges which accrue on a particular calling card account then become the responsibility of the calling card account holder (e.g. a particular individual or corporation). In this manner, one can use a pay telephone without inserting coins into that device.

If a telecommunications company receives a valid sequence of digits when calling card number entry is requested, the call is allowed to complete. Conversely, if the telecommunications company receives an invalid sequence of digits when calling card number entry is requested, the call is not allowed to complete. Thus, the security in the use of a calling card number lies in the confidentiality of that number. In other words, by not divulging one's calling card number, unauthorized use of the calling card account is effectively prevented.

Using the United States as an exemplary origination point, a caller could bill a telephone call to a calling card account from a public telephone by simply dialing the international access code (e.g. 011 or 01) followed by the country code, the city code and the number of the party being called. The caller would then receive a tone. He would then enter the numbers of the calling card into the telephone. This may be accomplished, for example, by pressing appropriate push buttons on a DTMF keypad.

An alternative way to place calls using a telecommunications device is through the use of night answer and automated voice response systems. By entering a series of digits which call one of these systems, "entry" into the system is obtained. Then, by entering additional digits (e.g. an access code), the system may be directed to place a telephone call to anywhere in the world. The owner of the system (e.g. a corporation) is billed for the cost of any call which is completed by the system. An exemplary system of this type is described in U.S. Pat. No. 4,747,124 entitled "PBX TELEPHONE CALL CONTROL SYSTEM" which is incorporated by reference for its teachings in the field of automated voice response systems. Again, the security in preventing unauthorized use of such a system lies in maintaining the confidentiality of any access codes which enable system operation.

Although the methods described above appear to be secure, there are several ways in which unauthorized calls can be made using such systems. Calling card numbers may be stolen, for example, by watching an unsuspecting user enter the numbers. Until the theft has been discovered and the account cancelled, these numbers can be used by the observer to fraudulently place phone calls. The calling card account holder is then charged for the cost of the calls. By using stolen calling card numbers in this manner, it is possible to fraudulently place many international calls which originate from the United States.

Similarly, fraudulent calls may be placed using night answer and automated voice response systems. Again, security digits, unknowingly obtained by a thief, can be entered into a telephone key pad in order to signal a night answer or automated voice response system to place a long distance or international call. In this manner, the owner of the corporation is automatically billed for the cost of such a call without the corporation's consent.

One solution which minimizes fraudulent calls from public telephones is to block number sequences which access international telecommunications services. Such services are often accessed from public telephones by initially entering the digit sequence 01. Furthermore, recent legislation in the United States has provided a variety of alternative codes for placing international calls. Exemplary codes include 10xxx, 950, and 1–800.

In addition to accessing international telecommunications services, the codes set forth above may be used for accessing long distance services (e.g. interstate calls). Current United States law prevents the blockage of interstate calls from public telephones when these calls are placed using certain access codes. Thus, although the blockage of calls based solely on the detection of the number sequences specified above would prevent access to international telecommunications services, the blockage of calls based solely on the detection of the number sequences specified above would be unlawful, because interstate calls would be blocked as well.

Additional access codes may be created in the future for accessing long distance and/or international telecommunication services. Future United States law may prevent the blocking of these future created codes.

SUMMARY OF THE INVENTION

The present invention relates to a method and apparatus for intercepting potentially fraudulent telephone calls which originate with a dialing sequence which includes a first plurality of dialing digits followed by a second plurality of dialing digits followed by a third plurality of dialing digits. The call is blocked if the first plurality of dialing digits and the third plurality of dialing digits are determined to be respective predetermined digits.

BRIEF DESCRIPTION OF THE DRAWINGS

FIG. 1A is a block diagram which illustrates a first exemplary embodiment of the present invention.

DETAILED DESCRIPTION

Figure 1B:
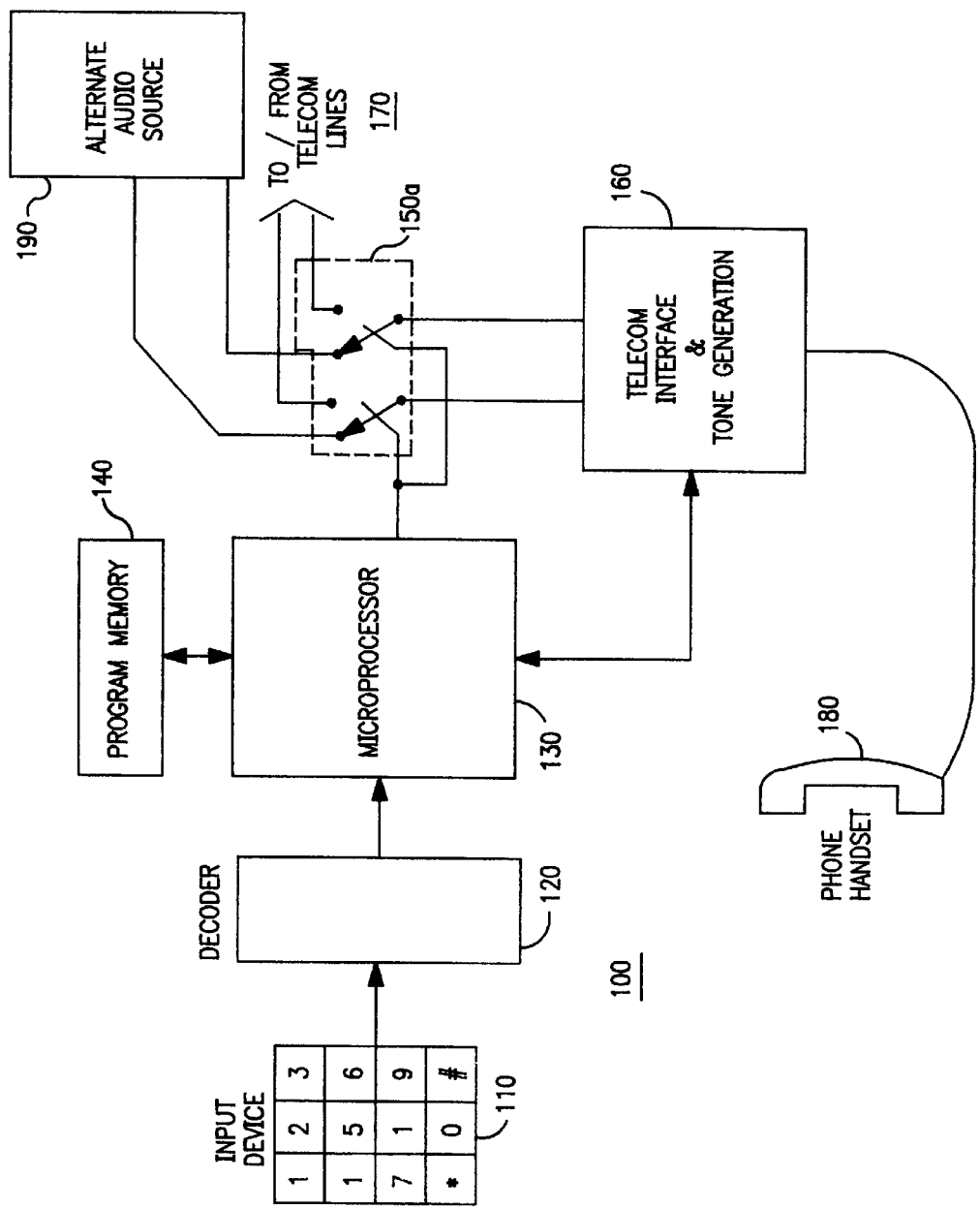
FIG. 1B is a block diagram which illustrates a second exemplary embodiment.

A first exemplary embodiment of the present invention is illustrated in FIG. 1A. As shown in FIG. 1A, a telecommunications device 100 is coupled to telecommunication lines 170 through telecommunication interface and tone generation circuitry 160. In an exemplary embodiment of the present invention, item 160 includes semiconductor device TP5088 (manufactured by National Semiconductor Corporation). Furthermore, the telecommunications interface may be implemented using circuit configurations which are well known to one skilled in the art of designing telecommunications systems.

Telecommunication line 170 may be used for a variety of different functions, for example, for interfacing to any type of commercial-telephone network. Alternately, telecommunications line 170 may be used for interfacing to any type of private network including, but not limited to, government or corporate owned networks. Furthermore, telecommunications line 170 may be used for interfacing to a limited access type network, for example, a telecommunications line which has been specifically identified by a central office (or an analogous switch) for dedicated use (e.g. pay telephone signalling protocols). Furthermore, telecommunications line 170 may be coupled to a variety of telephone networks (e.g. a cellular network). Thus, the invention may also be used for portable (including cellular) applications.

Switch 150 is located between telecommunication interface and tone generation circuitry 160 and telecommunication lines 170. By applying an appropriate control signal to switch 150, communications between telecommunications device 100 and telecommunications lines 170 can be effectively stopped. Switch 150 is shown disconnecting one of several connections between telecommunication interface and tone generation 160 and telecommunication lines 170. However, more than one switch (not shown) may be used so as to disconnect each connection between telecommunication interface and tone generation circuitry 160 and telecommunications lines 170.

The control signal which is received by switch 150 originates from microprocessor 130. In an exemplary embodiment of the present invention, microprocessor 130 may be a device such as a Z80 semiconductor device, 6800 semiconductor device, etc. Microprocessor 130 is coupled to program memory 140 in which appropriate routines for use by microprocessor 130 are stored. Exemplary programs for controlling the microprocessor 130 are described below with reference to FIGS. 4A, 4B and 4C.

As shown in FIG. 1A, input device 110 may be used for entering a plurality of digits into telecommunications device 100. Input device 110 is coupled to decoder 120. In an exemplary embodiment of the present invention, decoder 120 may be semiconductor device 74C923 manufactured by National Semiconductor Corporation. Each digit which is entered using input device 110 is detected by decoder 120. Decoder 120 transmits this information to microprocessor 130. Microprocessor 130 then transmits appropriate signals to telecommunication interface and tone generation 160.

In an exemplary embodiment of the present invention, a user enters a plurality of numbers using input device 110. Based on the particular digit sequence which is entered, microprocessor 130 directs telecommunication interface and tone generation 160 to produce appropriate DTMF tones. Assuming switch 150 is in the closed position, these tones are transmitted to telecommunication lines 170.

Furthermore, in an exemplary embodiment of the present invention, numbers are entered using a telephone keypad. However, it is contemplated that alternative methods for entering telephone digits may be used in order to produce appropriate tones from telecommunication interface and tone generation circuitry 160. For example, a desired number sequence may be entered using a traditional rotary device (not shown). Alternately, a digit sequence may be stored in an information medium (not shown) (e.g. a credit card magnetic stripe, a smart card, etc.). The telecommunications device may include a reader (not shown) which is capable of reading the digit sequence (e.g. from the magnetic medium, the smart card, etc.). Alternately, a digit sequence may be spoken by the user and then converted into appropriate electronic signals by voice recognition circuitry (not shown). Thus, it is understood that the digit sequence may be entered into telecommunications device 100 in a variety of ways.

Program memory 140 includes appropriate software routines in order to prevent the use of telecommunications device 100 if particular conditions are met. In particular, microprocessor 130 examines the sequence of digits which are entered by input device 110. If microprocessor 130 determines that particular digits have been entered at particular places in the dialing sequence, microprocessor 130 signals switch 150 to open, thus disconnecting the call. Such a determination may be performed, for example, by comparing the entered telephone number with a plurality of telephone numbers located in a table which is accessible to microprocessor 130. Table entries may include "don't care" values to indicate digits and locations in the dialing sequence which should not serve as a basis for preventing completion of the telephone call. These "don't care" values may be situated between two groups of dialing digits (each group including at least two dialing digits). Put another way, the don't care values (and their corresponding signal values) are interposed between a first group of dialing digits (i.e. first signal values) and a second group of dialing digits (i.e. second signal values). Each of these two groups of dialing digits are thus evaluated to determine if the call should be allowed to complete. For example, the first of the two groups of dialing digits (and their corresponding signal values) may be compared to first test signal values and the second of the two groups of dialing digits (and their corresponding signal values) may be compared to second test signal values to make this determination. Further "don't care" values may precede or succeed either or both of the two groups of dialing digits. Software to implement this algorithm is readily synthesized by one skilled in the art.

Exemplary "don't care" values which follow the second group of dialing digits may include a country code, a city code and a local number. This local number includes a central office exchange code which indicates an exchange area (i.e. one or several central offices) through which the call will proceed before reaching the destination subscriber. The use of this terminology is illustrated by a call to Paris:

33-1-local number. 33 is presently the country code and 1 is the city code. For calls to North America outside of the United States, the "don't care" values may simply contain a local number (i.e. without a country code and a city code). Again, this telephone number will also include a central office exchange code to indicate the exchange area (or one or several central offices) through which the call will proceed before reaching the destination subscriber.

In an exemplary embodiment of the present invention, detection of one or more of the following digit sequences in the dialing sequence results in the blocking of a telephone call:

TABLE I

10XXX01
950XXXX01
1800XXXXXXX01

In addition, it is possible to block international calls which are accessed using a three digit area code. Exemplary international telephone numbers which result in a blocked call include:

TABLE II

950XXXX0809
1800XXXXXXX0809
10XXX0809

If entered into a telecommunications device which is not in accordance with the present invention, these particular sequences allow an individual who has fraudulently obtained a calling card number to place long distance or international calls without authorization. By blocking a telephone call when any of these exemplary digit sequences are entered, the unauthorized use of calling card numbers for long distance and international calls may be effectively prevented.

It is contemplated that additional numerical sequences may allow an individual to access long distance and international communication carriers. These numerical sequences include two or more predetermined digits which are located at particular places in the dialing sequence. The particular places where each of these digits is located may be at the beginning, the middle or the end of the dialing sequence. Furthermore, additional digits may be interposed between the predetermined digits. Microprocessor 130 (via program memory 140) can be programmed to detect when these digits have been entered, and to cause switch 150 to open upon detection of these digits.

A further exemplary embodiment of the present invention is illustrated by FIG. 1B. FIG. 1B is similar to FIG. 1A. However, switch 150 has been replaced with switch 150A. Furthermore, switch 150A is connected to alternate audio source 190. The plurality of digits which are entered upon making a telephone call are examined, as in the exemplary embodiment which is illustrated by FIG. 1A. However, in the exemplary embodiment which is shown by FIG. 1B, when predetermined digits are located at particular locations in the dialing sequence, microprocessor 130 signals switch 150A to disconnect telecommunication interface and tone generation 160 from telecommunication lines 170. Furthermore, the signal which is transmitted from microprocessor 130 causes switch 150A to connect telecommunication interface and tone generation 160 to alternate audio source 190. Alternate audio source 190 may transmit a message to the telephone user, explaining to the user that a telephone call cannot be made from telephone unit 100 using the telephone number which has been entered.

In the embodiments of the present invention which are illustrated by FIGS. 1A and 1B, possibly fraudulent telephone calls can be handled by both embodiments in one of two ways. First, the telephone call can be terminated immediately upon detection of predetermined digits at particular places in the dialing stream. Thus, each digit in the dialed telephone number is transmitted to telecommunication line 170 as the digit is entered by the telephone user. Alternatively, as each digit is entered, it may be stored in microprocessor 130. In this instance, none of the dialed digits is transmitted to telecommunication line 170 until all of the digits in the dialed telephone number have been entered. If predetermined digits are detected at specified locations in the dialing sequence, then the entered telephone number is not transmitted to telecommunication line 170. Furthermore, as shown in the exemplary embodiment of the present invention which is illustrated by FIG. 1B, the telephone user may then receive a message from alternate audio source 190 indicating that the attempted telephone call will not be allowed to proceed. Alternately, if the predetermined digits are located, the call may be automatically routed to the police, to management of the installation containing the public telephone, or to a recording.

In a further exemplary embodiment of the present invention, switch 150 (of FIG. 1A) and switch 150A (of FIG. 1B) are not included. Thus, telecommunication interface and tone generation circuitry 160 is connected directly to telecommunication lines 170. Upon the detection of predetermined digits at particular places in the dialing sequence, the user is prevented from entering additional digits corresponding to a telephone number into telecommunications device 100. The user may be prevented from entering these further digits in several ways. For example, a signal from microprocessor 130 may disable input device 110. Alternately, microprocessor 130 may disable decoder 120. Microprocessor 130 may also be programmed to simply suspend all processing within telecommunications device 100 until a signal (such as an "on-hook" condition) is detected. In this manner, use of telecommunications device 100 is effectively suspended.

In a further exemplary embodiment of the present invention, use of telecommunications device 100 is suspended if the dialing sequence which has been entered does not correspond to one of a plurality of dialing sequences which have been appropriately stored within telecommunications device 100. For example, if a particular dialing sequence which has been entered does not correspond to one of a plurality of 800 numbers which have been stored within telecommunications device 100, a signal from microprocessor 130 may be generated to disable input device 110. Alternately, microprocessor 130 may disable decoder 120. In this manner, full use of telecommunications device 100 is only allowed if one of a plurality of phone numbers have been entered.

In FIGS. 1A and 1B, switches 150 and 150A are each shown as a physical switch. However, it is understood that switches 150 and 150A may be implemented as mechanical switches, electronic switches, etc. Furthermore, switches 150 and 150A may be constructed in a manner such that they are capable of achieving electrical isolation between different terminals associated with the switch, while appropriate physical connections are maintained.

Figure 2A:
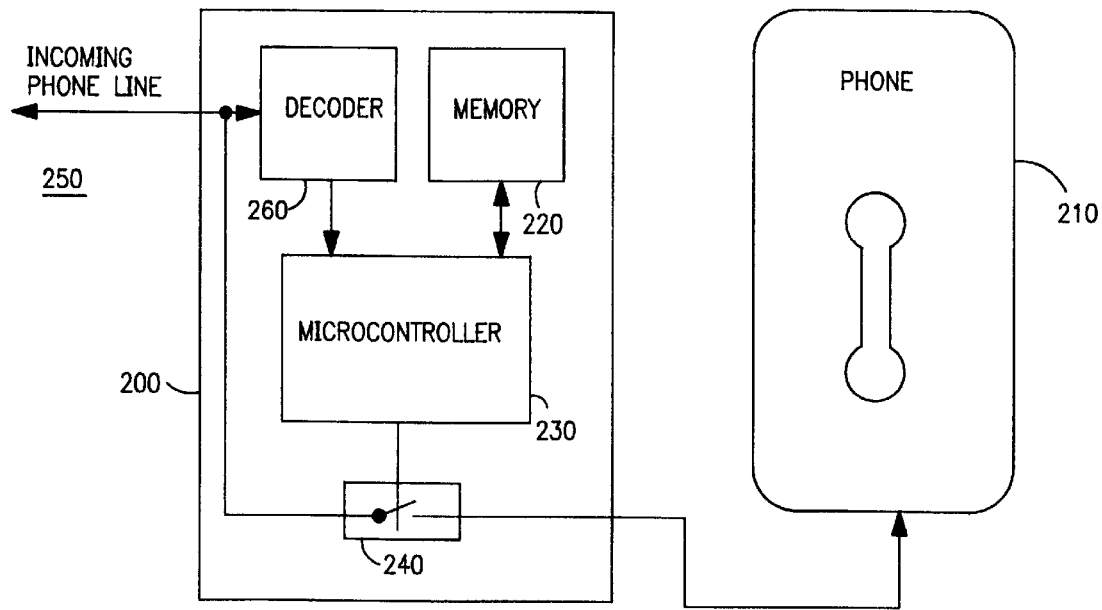
FIG. 2A is a block diagram which illustrates a third exemplary embodiment of the present invention.

A further exemplary embodiment of the present invention is illustrated by FIG. 2A. In FIG. 2A, telecommunications device 210 is connected to telecommunication lines 250 via interface unit 200. As in the exemplary embodiment to the present invention which is illustrated by FIG. 1A, telecommunications line 250 may have a variety of different functions.

The exemplary embodiment which is illustrated by FIG. 2A includes microcontroller 230 which receives instructions from memory 220. Decoder/DTMF generator 260 receives a plurality of telephone numbers which are provided by telecommunications device 210. The telephone number sequence is converted to electrical signals which are transmitted to microcontroller 230. If microcontroller 230 detects that specific, predetermined digits have been entered at particular locations in the dialing sequence (as in the embodiment illustrated by FIG. 1A), microcontroller 230 may signal switch 240 to open. This causes a termination of the telephone call.

Although switch 240 is shown connected between telecommunications device 210 and tone converter 260, it is contemplated that switch 240 can be located anywhere between telecommunications device 210 and telecommunication lines 250 which would cause the telephone call to be terminated when the switch is opened.

Figure 2B:
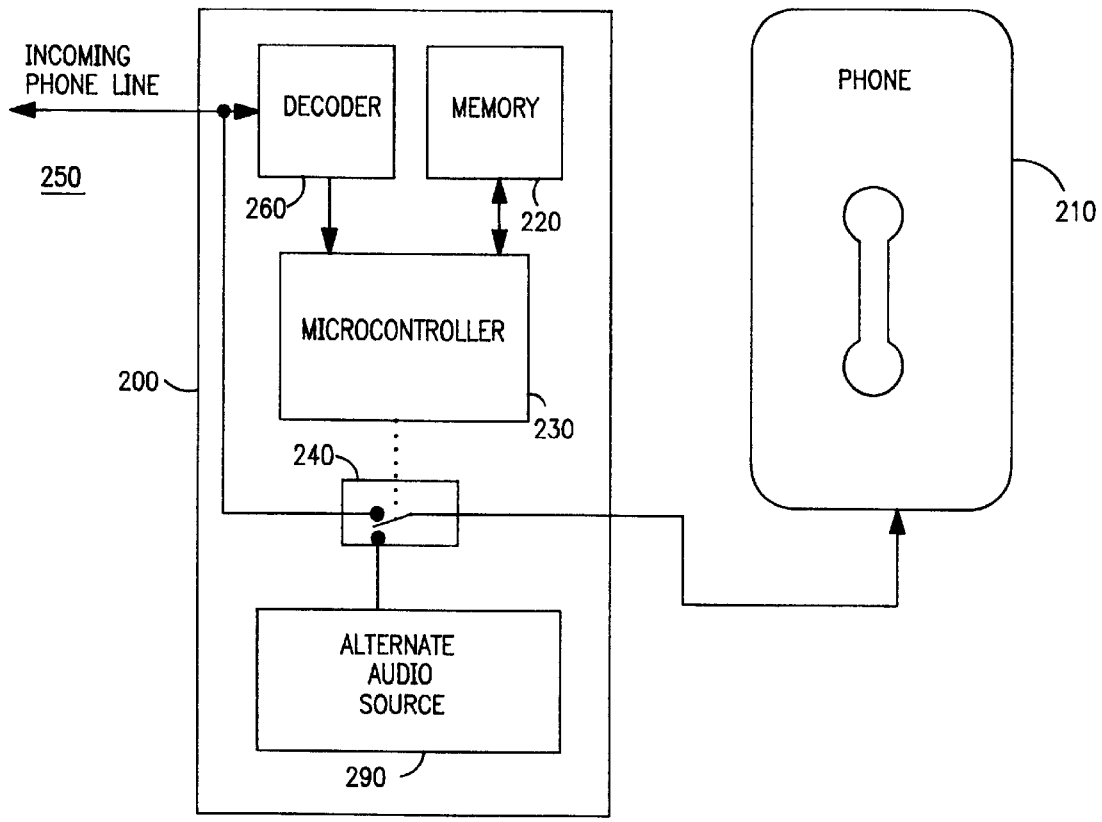
FIG. 2B is a block diagram which illustrates a fourth exemplary embodiment of the present invention.

A further exemplary embodiment to the present invention is illustrated by FIG. 2B. As shown in FIG. 2B, microcontroller 230 may determine that at least two predetermined digits have been entered at appropriate locations in the dialing sequence (as in the embodiment illustrated by FIG. 1A). Microcontroller 230 may then signal switch 240 to connect phone 210 to alternate audio source 290. In this manner, a message is transmitted from alternate audio source 290 to phone 210 which indicates that the attempted telephone call is not allowed.

The exemplary embodiments of the present invention which are illustrated by FIG. 2A and 2B may have various features which are included in the exemplary embodiments which are illustrated by FIGS. 1A and 1B. One skilled in the art could readily implement any of the features which are illustrated by FIGS. 1A and 1B into the embodiments which are illustrated by FIGS. 2A and 2B.

Figure 2C:
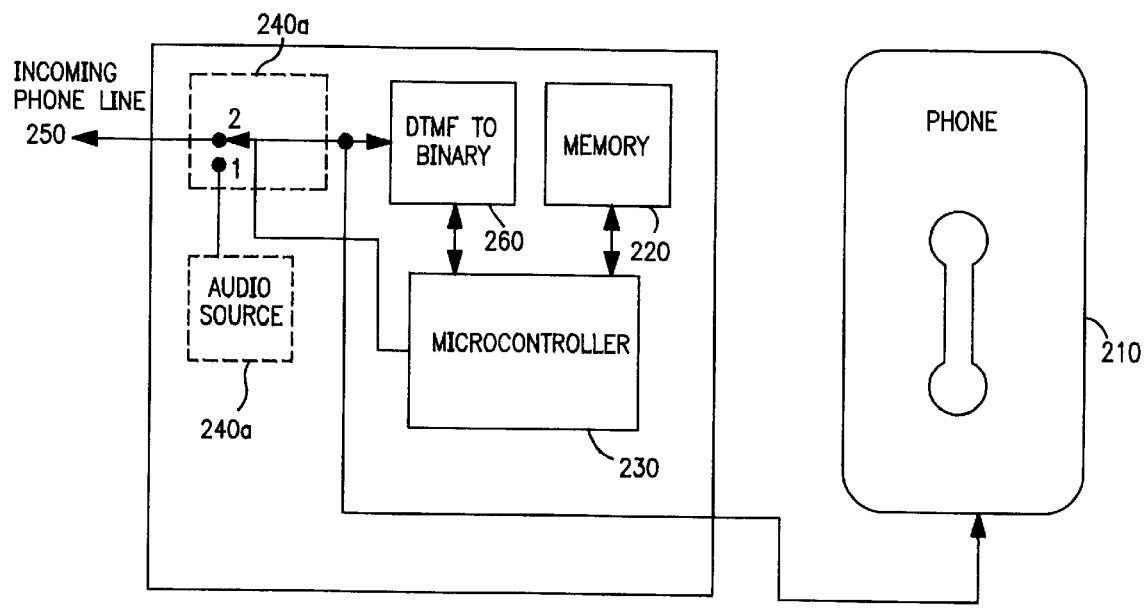
FIG. 2C is a block diagram which illustrates a fifth exemplary embodiment of the present invention.

A further exemplary embodiment of the present invention is illustrated by FIG. 2C. In this exemplary embodiment, switch 240A can be maintained in position 2 until microcontroller 230 determines that predetermined digits have been entered at specified locations in the dialing sequence (as in the embodiment illustrated by FIG. 1A). If this occurs, switch 240A can be moved to position 1. Audio source 290A is optionally included. If audio source 290A is included, a message can be transmitted to the user of phone 210 when microcontroller 230 places switch 240A into position 1.

Alternately, switch 240A can be maintained in position 1 while the number is entered from telephone 210. After all of the digits have been entered and microcontroller 230 has determined that a valid telephone number has been entered, switch 240A can be moved to position 2. Microcontroller 230, through converter 260 may then transmit the telephone number to telecommunications line 250.

In a further exemplary embodiment of the present invention, velocity checking on dialed numbers may be implemented. Velocity checking may be used for detecting dialing of the same phone number (or portions thereof) in excess of a predetermined number of times over a certain time period. In response to velocity checking, the telecommunications device can be selectively disabled in order to prevent fraudulent telephone activity.

Thus, for example, if a first signal stream and a second signal stream generated by one or more telephones within a certain time period correspond to the same phone number (or portions thereof) the telephones generating these signal streams can be selectively disabled. This may also apply to other numbers (e.g. calling card numbers) as set forth below.

In a further exemplary embodiment of the present invention, velocity checking on calling card numbers may be implemented. By isolating a calling card number in the dial digit stream (based upon the entered dialing sequence), multiple occurrences of a single calling card number (or portions thereof) may be determined. If this calling card number is found to be used in excess of a certain threshold over a certain time period, the telecommunications device may be disabled.

In the velocity checking operations described above, data compress i on (encryption) algorithms may be applied to entered phone numbers and calling card numbers and multiple levels of testing may be used in order to reduce the amount of memory storage required. For example, at a first level of testing, velocity checking based solely on area codes or international codes may be implemented. At a second level of testing, velocity checking on frequently used exchanges within frequently used area codes may be implemented. Furthermore, a second level of testing may be implemented in conjunction with the first level of testing. At a third level of testing, the last four digits of the most frequently used area codes and exchange combinations may be examined to determine specific ten digit numbers being dialed. In addition, the frequency of these calls may be determined. This allows the ability to pinpoint a few exact ten digit telephone numbers (out of approximately ten billion combinations) of high usage calls using a small subset of that amount of data storage memory (10 to 20 thousand variables).

Velocity checking may also be based on alternative groupings of entered digits, besides or in addition to those combinations of entered digits stated above. For example, a similar type of compression may be implemented for calling card numbers (or portions thereof) in accordance with practices which are well known to one skilled in the art.

The information which is gathered while conducting velocity checking as described above may be transmitted by the telecommunications device to a remote station. Thus, the telecommunications device could transmit statistical or detailed reports on phone activity for a given period of time.

Furthermore, a group of telephones may be networked so that their individual data is collected on a remote computer (not shown). At this remote computer, another level of velocity checking can be performed on the combined data. Such networking facilitates the detection of telephone fraud in which a group of perpetrators are placing fraudulent calls from several telephones which are in close physical proximity. Detection of the occurrence of this telephone fraud is thus facilitated.

Furthermore, in accordance with the velocity checking described above, signals can be transmitted to the telephones which are used for fraudulent activity. If these telephones are responsive to these signals, telephone calls which are placed using the detected numbers can be blocked or redirected as explained above.

Figure 3A:
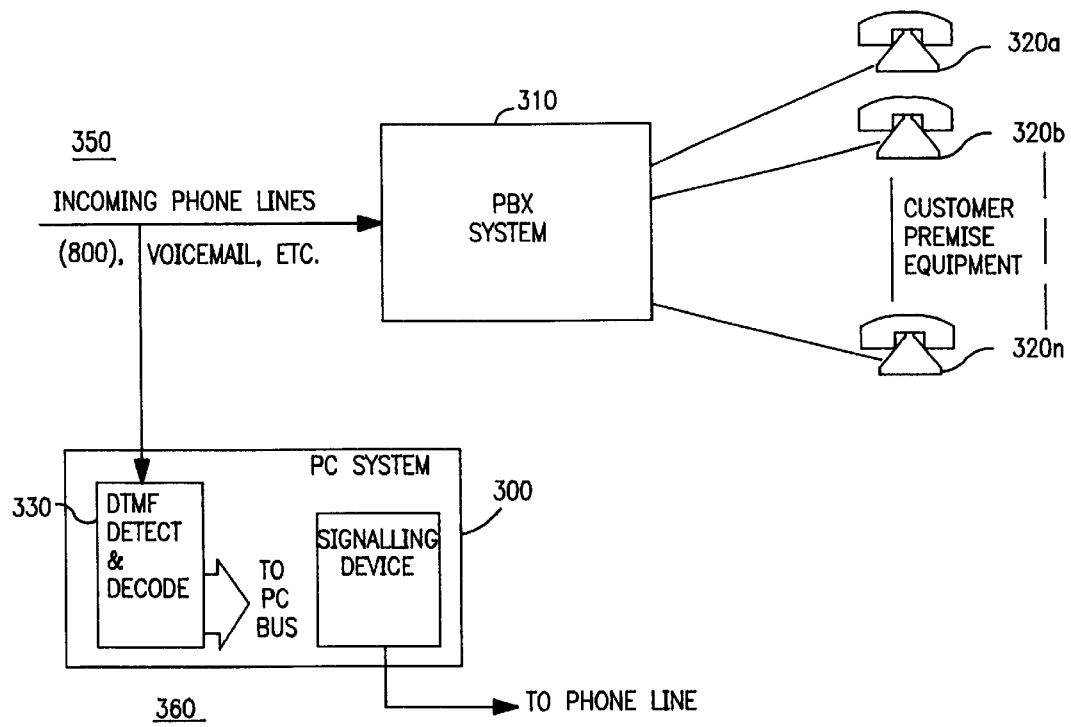
FIG. 3A is a block diagram which illustrates a sixth exemplary embodiment of the present invention.

A further exemplary embodiment of the present invention is illustrated by FIG. 3A. Telecommunications line 350 is connected to PBX System 310. PBX System 310 is connected to customer premise equipment 320A through 320N. PC System 360 is connected to telecommunication lines 350. PC System 360 includes DTMF detector 330 and signalling device 340. DTMF detector 330 converts DTMF signals received from telecommunication lines 350 into a plurality of signals which are transmitted to PC System 360. If PC System 360 determines (using velocity checking) that predetermined digits have been used in a plurality of dialing sequences at specific locations, a message may be sent to signalling device 340, by PC System 360 to indicate that potentially fraudulent activity is occurring. An appropriate individual (or appropriate automated devices) may then take further action, such as terminating the call, monitoring the call, etc.

Figure 3B:
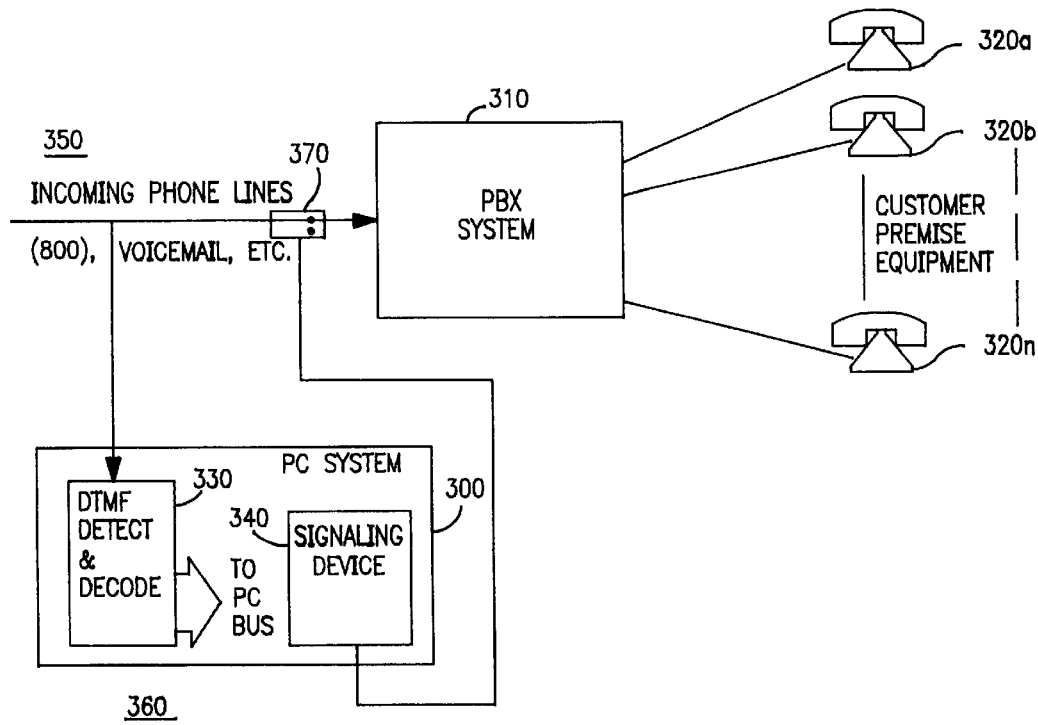
FIG. 3B is a block diagram which illustrates a seventh exemplary embodiment of the present invention.

In a further exemplary embodiment of the present invention which is illustrated by FIG. 3B, the output of signalling device 340 is transmitted to switch 370. Thus, upon the detection of predetermined digits at appropriate locations in the dialing sequence by PC System 360, the connection between the incoming phone line 350 and PBX System 310 is terminated. Thus, the telephone call is automatically terminated.

The embodiments of the present invention which are illustrated by FIG. 3A and FIG. 3B can also be used with a trunk type system. Thus, the fraudulent use of a PBX in multiplexed message environment can be effectively regulated.

In a further exemplary embodiment of the present invention, the output of signalling device 340 is connected directly (not shown) to PBX System 310. In this manner, PBX System 310 receives an appropriate signal which prevents use of the PBX System for placing the fraudulent call.

Figure 4A:
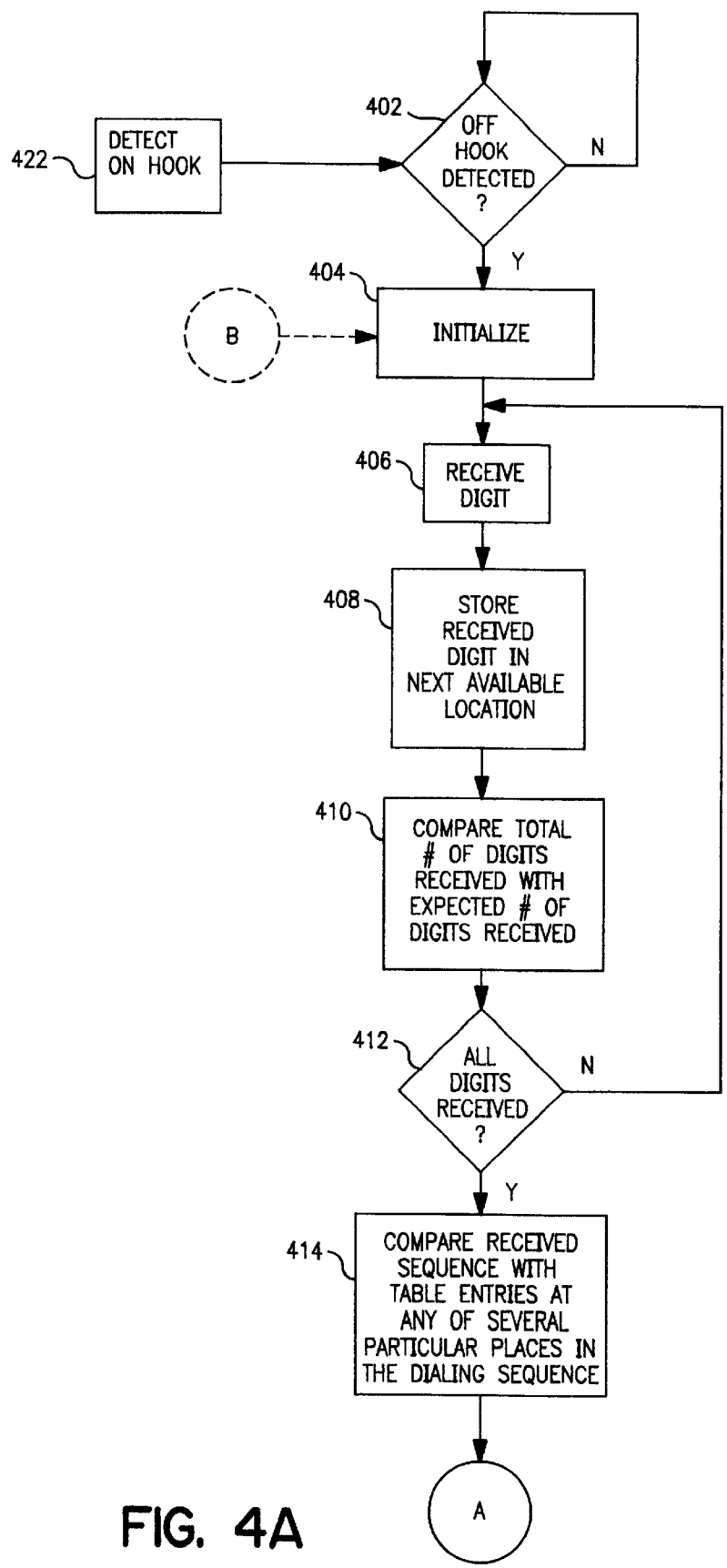
FIG. 4A is a portion flow chart diagram which illustrates the operation of an exemplary embodiment of the present invention.

A flow chart diagram which illustrates the operation of the present invention is shown in FIG. 4A. At step 402, microprocessor 130 waits for an off-hook condition. When an off-hook condition is detected, the appropriate software is initialized at step 404. At step 406, as the caller enters each digit into the telecommunications device, each digit is received. At step 408, each digit is stored at a next available location associated with microprocessor 130. At step 410, the total number of digits which have been received is compared with the expected number of received digits. The expected number of received digits is determined in accordance with national (i.e. United States) telecommunication dialing protocols by identifying the use of particular digits in the dialing sequence. Alternately, in place of step 410, processing may continue after a predetermined period of time has elapsed. At step 412, if all digits have not been received, execution of the computer software proceeds to step 406, at which point another digit entered by the user is processed. Otherwise, at step 414, the received sequence of digits is compared with table entries at any of several particular places in the dialing sequence such as those illustrated in Tables 1 and 2 above. Execution of the computer software then proceeds to step 416 via off-page connector A. If, at step 414, a match is determined, then at step 416, control continues to step 418 at which point the call is blocked. Alternately, at step 416, if no match is found, control continues to step 420 at which point a line is obtained and the entered digits are transmitted to the telephone line to initiate the call.

In an alternative embodiment of the present invention, after the call is blocked at step 418, control continues to step 404 at which point the computer software is initialized and a new sequence of digits may be entered. At any time, if an on-hook condition is detected (step 422), then, control is transferred to step 402.

Figure 4B:
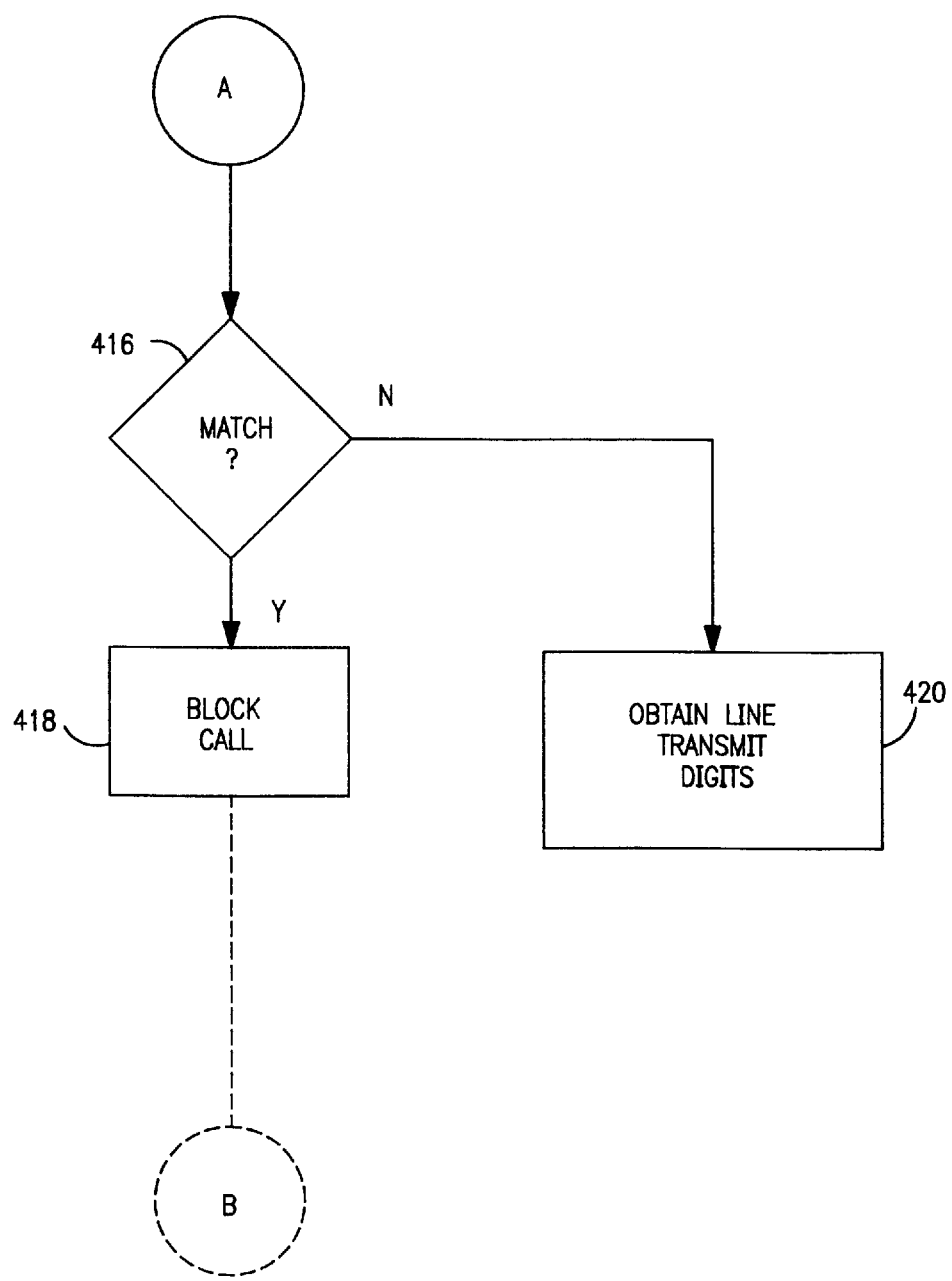
FIG. 4B is a further portion of the flow chart diagram of FIG. 4A which illustrates the operation of an exemplary embodiment of the present invention.

A further exemplary embodiment of the present invention is illustrated by FIG. 4B. At step 450, when an off-hook condition is detected, the computer software is initialized. At step 456, a line is obtained. At step 458, a dialing digit is received from the telephone user. This dialing digit is transmitted to the available line. At step 460, the received dialing digit is stored in a next available location associated with microprocessor 130. At step 456, the received digits are compared with a plurality of stored numbers at any of several particular places in the dialing sequence. At step 464, if a match is found, then, at step 466, the call is blocked. Alternately, if no match is found at step 464, execution of the computer software continues at step 458, at which point another dialing digit is received from the telephone user. If all dialing digits have been entered without determination of a match at step 464, the call is allowed to complete. If, at any time, an on-hook condition is detected (step 452), then processing automatically continues at step 450.

Figure 4C:
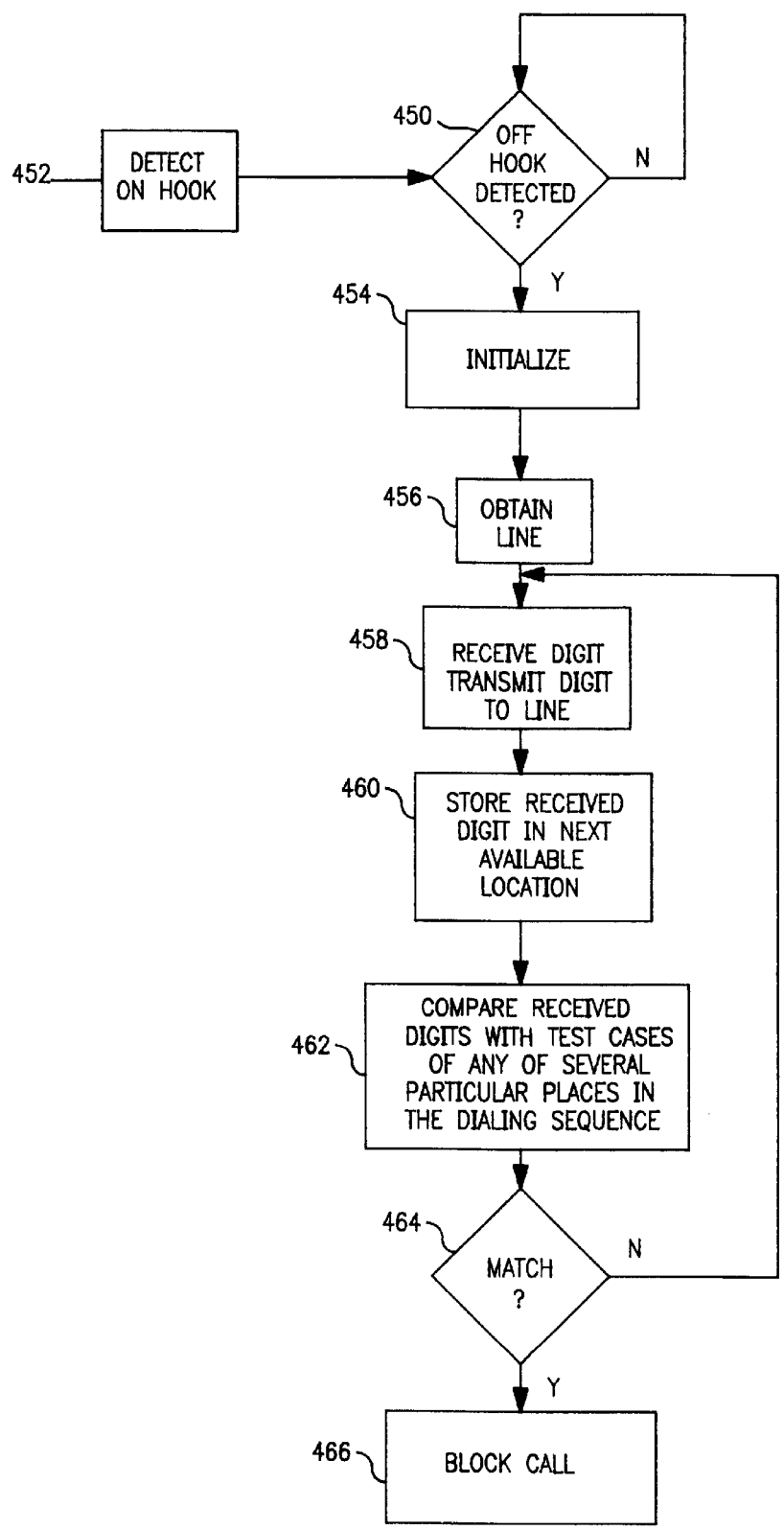
FIG. 4C is a flow chart diagram which illustrates the operation of a further exemplary embodiment of the present invention.

The exemplary embodiments of the present invention which are illustrated by FIGS. 4A, 4B and 4C may be slightly modified so that these algorithms may be used in accordance with the exemplary embodiments of the present invention which are illustrated by FIGS. 3A and 3B. By implementing these algorithms in conjunction with velocity checking, a signal can be transmitted which alerts an individual (or automated devices) that potentially fraudulent telephone calls are occurring. Furthermore, such a signal can be used for preventing the PBX from completing the call by opening a switch on a telecommunications line which is connected to the PBX, selectively disabling operation of a multiplexed trunk line or transmitting a separate signal to the PBX in order to disable at least a portion of the PBX.

In a further exemplary embodiment of the present invention, a plurality of signal values (such as a dialing sequence) is entered using input device 110. Upon receiving this plurality of signal values, microprocessor 130 determines if the entered signal value corresponds to one of several signal value sequences (i.e. one of several dialing sequences). This determination is made by comparing the signal values which have been entered with a list of signal value sequences. In an exemplary embodiment of the present invention, at least one of the signal value sequences which serves as the basis of the comparison includes an 800 area code. If the entered signal value sequence does not correspond to one of the signal value sequences which serves as the basis of the comparison, the communications pathway is prevented from receiving further signal values (i.e. further dialing numbers, further DTMF tones, etc.) until an appropriate signal (such as an on hook signal or some other type of disconnect signal) is received. This may be accomplished by disabling input device 110, disabling decoder 120, executing an appropriate routine within microprocessor 130, or any other method which would be known to one skilled in the art to prevent further dialing signals from being transmitted over the communications pathway to which telecommunications device 100 is coupled. This technique is particularly useful for preventing an individual from dialing into a PBX system and then making further phone calls over a further communications pathway which is coupled to the PBX system.

In a further exemplary embodiment of the present invention, the communications pathway is prevented from receiving further signal values if the signal values which have been received do correspond to any one dialing sequence which serves as the basis of the comparison.

In the above description, numerous references have been made to the blocking of a telephone call or the control of fraudulent activity. It is understood that any of a variety of methods may be used to prevent fraudulent use of the telecommunications device including, but not limited to, severing appropriate connections, muting the mouthpiece, disabling the digit entry device (i.e. the keypad), etc.

Figure 5:
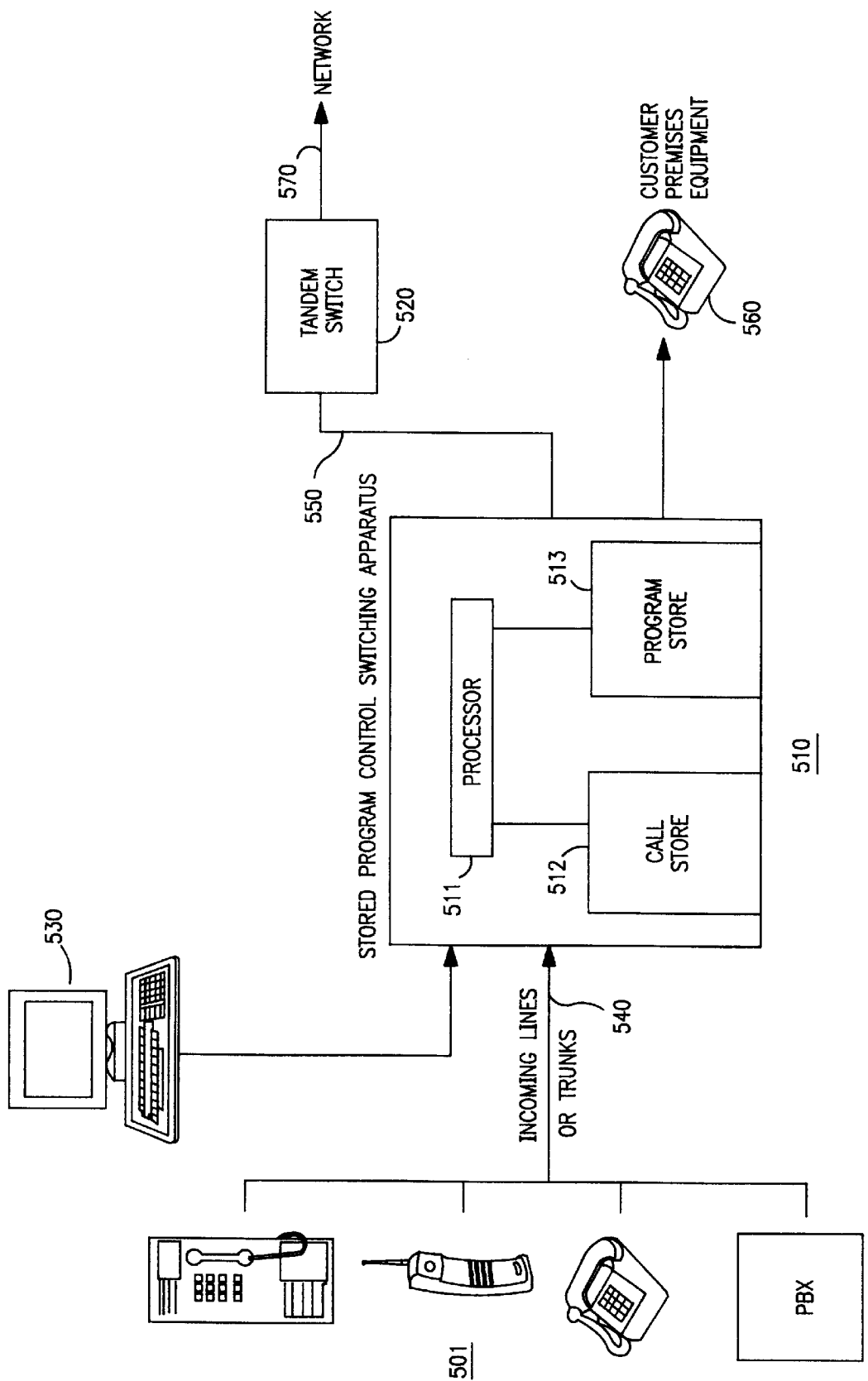
FIG. 5 is a block diagram which illustrates a system in which an eighth exemplary embodiment of the present invention can be implemented.

A further exemplary embodiment of the present invention is illustrated by FIG. 5. Originating Party Unit 501 is coupled to Stored Program Control Switching Apparatus 510 through telecommunication lines 540. Originating Party Unit 501 may be a residential telephone, a business telephone, or some sort of public telephone (e.g. a coin telephone). Stored Program Control Switching Apparatus 510 may be included in an End Office (not shown) and may be categorized, for example, as a Class V switch. Stored Program Control Switching Apparatus 510 may be coupled to Terminating Party Unit 560. Stored Program Control Switching Apparatus 510 may also be coupled to a network 570 through tandem switch 520. Tandem switch 520 may be, for example, a Class IV switch. Other structures which would be obvious to one skilled in the art (e.g. DTMF decoders) are not shown for purposes of clarity.

Stored Program Control Switching Apparatus 510 includes a call store 512. Call store 512 receives and stores dialing signals which are generated as a result of the use of Originating Party Unit 501. Program store 513 includes instructions for processing the dialing signals which are received and stored by call store 512. Processor 511 receives instructions from program store 513 and performs appropriate processing of the dialing signals stored in call store 512.

Processor 511 is capable of receiving dialing signals from call store 512 and instructions from program store 513. Under the control of program store 513, processor 511 is able to determine whether a sufficient number of signal values have been received by call store 512 to establish a connection to another switch, to a local telephone or to take other action, e.g., play a recording or disconnect. The contents of program store 513 can be updated from a remote terminal (e.g. switch programmer 530) so that instructions for call processing can be added, deleted or changed.

In the above manner, program store 513 can include instructions so that processor 511 prevents fraudulent call attempts. In particular, program store 513 can include instructions for implementing any of the algorithms set forth above. For example, program store 513 can include algorithms for preventing call completion when dialing sequences such as those indicated in TABLE I (above) and TABLE II (above). Alternately, program store 513 can include algorithms for preventing call completion in accordance with the velocity checking algorithms set forth above. Furthermore, program store 513 can include algorithms for preventing call completion if the received dialing sequence corresponds (or does not correspond) to any of a plurality of dialing sequences included in a table. One skilled in the art could readily modify any of the algorithms set forth above with respect to FIGS. 1–4 and any of the exemplary embodiments set forth above for implementation with respect to the system illustrated by FIG. 5.

In an alternative embodiment of the present invention, Stored Program Control Switching Apparatus 510 is included in another switch (e.g. a tandem switch or any other switch situated at any point along a telecommunications network or PBX) and the algorithms set forth above are implemented for use in the switch which includes Stored Program Control Switching Apparatus 510. Thus, the algorithms set forth above may be implemented within Program Control Switching Apparatus 510 at any point within a telecommunications network or a PBX.

While the invention has been described in terms of an exemplary embodiment, it is contemplated that it may be practiced as outlined above with modifications within the spirit and scope of the appended claims.

What is claimed:

1. Telecommunications apparatus for selectively preventing establishment of a telephone call to a telephone number having a central office exchange code, said telecommunications apparatus being capable of receiving a transmitted dialing sequence which includes a first plurality of dialing signals, followed by a second plurality of dialing signals followed by a third plurality of dialing signals, wherein said telephone call is placed through a telecommunications switch, said telecommunications apparatus comprising:

means for receiving said dialing sequence prior to receiving said central office exchange code;

means for evaluating said third plurality of dialing signals and for preventing said telecommunications switch from establishing said telephone call if said evaluated third plurality of dialing signals are determined to a) be in a location in sad dialing sequence to accomplish international dialing, and b) be respective predetermined signals which are used for international dialing irrespective of said second plurality of dialing signals.

2. Telecommunications apparatus according to claim 1 wherein said means for evaluating said third plurality of dialing signals includes means for evaluating said first plurality of dialing signals and for preventing said telecommunications switch from establishing said telephone call if said evaluated third plurality of dialing signals are determined to be respective predetermined signals which are used for international dialing and if said evaluated first plurality of dialing signals are determined to be further respective predetermined signals.

3. A method of controlling the operation of a telecommunications switch which is coupled to a telecommunications device which is capable of transmitting a sequence of signal values which includes a first plurality of digits followed by a second plurality of digits followed by a third plurality of digits followed by a central office exchange code so that a telephone call to a telephone number having said central office exchange code can be established, said method comprising the steps of:

a) receiving said sequence prior to receiving signal values corresponding to said central office exchange code;

b) evaluating said third plurality of digits;

c) preventing said telecommunications switch from establishing said telephone call if said evaluated third plurality of digits are determined to a) be in a location in said dialing sequence to accomplish international dialing and b) be a respectively predetermined digit sequence which is used for international dialing, irrespective of said second plurality of digits and d) allowing said telecommunications switch to establish said telephone call if said evaluated digits are not determined to be respectively predetermined digit sequences.

4. A method of controlling the operation of a telecommunications switch according to claim 3, wherein step (b) includes the step of evaluating said first plurality of digits and step (c) includes the step of preventing said telecommunications switch from establishing said telephone call if said third plurality of digits are determined to be said respectively predetermined digit sequence which is used for international dialing and said first plurality of digits are determined to be a further respectively predetermined digit sequence.

* * * * *

UNITED STATES PATENT AND TRADEMARK OFFICE
CERTIFICATE OF CORRECTION

PATENT NO. : 5,812,650
DATED : September 22, 1998
INVENTOR(S) : Gammino

It is certified that error appears in the above-identified patent and that said Letters Patent is hereby corrected as shown below:

Title page, item [54] and col. 1, the title should read as following:
-- METHOD AND APPARATUS FOR INTERCEPTING POTENTIALLY FRAUDULENT TELEPHONE CALLS --.

At column 12, line 14, "sad" should read --said--.

Signed and Sealed this

Twenty-sixth Day of January, 1999

Attest:

Attesting Officer

Acting Commissioner of Patents and Trademarks